R. G. TODD.
DRINKING TROUGH FOR CHICKENS.
APPLICATION FILED NOV. 7, 1916.
1,214,240.
Patented Jan. 30, 1917.
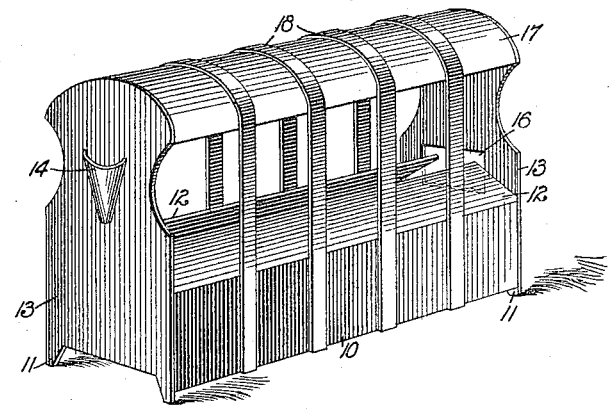
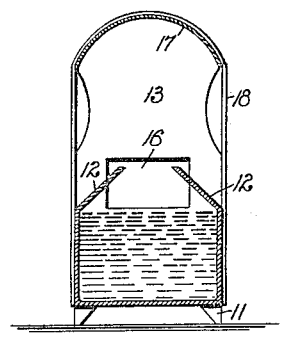
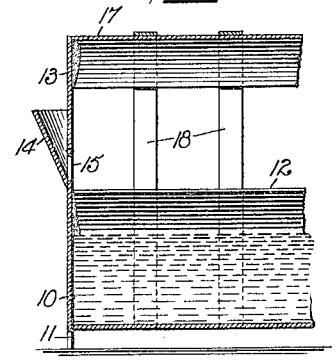
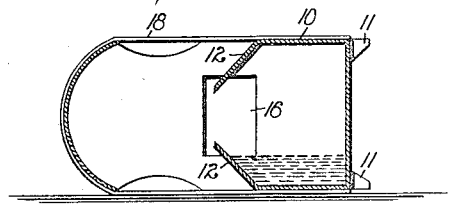
WITNESSES
INVENTOR
Roland G. Todd
BY
ATTORNEYS

UNITED STATES PATENT OFFICE.

ROLAND G. TODD, OF CLEARFIELD, PENNSYLVANIA.

DRINKING-TROUGH FOR CHICKENS.

1,214,240.  Specification of Letters Patent.  Patented Jan. 30, 1917.

Application filed November 7, 1916. Serial No. 129,963.

*To all whom it may concern:*

Be it known that I, ROLAND G. TODD, a citizen of the United States, and a resident of Clearfield, in the county of Clearfield and State of Pennsylvania, have invented a new and Improved Drinking-Trough for Chickens, of which the following is a full, clear, and exact description.

The general object of my invention is to provide a drinking trough of simple construction, so formed as to be sanitary in that the reservoir for the water is thoroughly protected against contamination by the chickens.

A more specific object of the invention is to provide a trough so constructed that should it be upset and thrown over on its side, it will nevertheless retain a quantity of water accessible to the chickens.

A further object is to provide a trough that can be thoroughly and readily cleaned.

The invention will be particularly explained in the specific description following.

Reference is to be had to the accompanying drawings forming a part of this specification in which similar reference characters indicate corresponding parts in all the views.

Figure 1 is a perspective view of a drinking trough embodying my invention; Fig. 2 is a transverse vertical section; Fig. 3 is a fragmentary, longitudinal, vertical section; Fig. 4 is a view similar to Fig. 2 but showing the trough thrown over on its side.

In constructing a drinking trough in accordance with my invention, a water reservoir 10 is provided which is preferably oblong. The trough is supported on suitable members such as legs 11. The reservoir 10 is formed with inwardly disposed inclined top members 12, the inner ends of which are sufficiently spaced to provide an elongated opening at the top of the reservoir, through which the water is accessible to the chickens along the full length of the trough and from either side.

The legs 11 are preferably integral with upright end members 13. In one end 13 is an inlet 15 through which water may be poured, there being a funnel element 14 at said opening. At the opposite end 13 an opening 16 is formed affording access to the water at that end, the said hole being disposed adjacent to the top of the water reservoir.

Comparing Figs. 2 and 4, it will be noted that should the trough be upset and thrown on its side as in Fig. 4, the ends 13 and the lower member 12 will retain a substantial quantity of water, the level of which is determined by the width of the opening 16. The chickens, in this position of the trough, can readily gain access to the water through the opening 16. It will be noted that the upper member 12 in Fig. 4 serves as a guard to deflect dirt away from the reservoir.

A roof 17 is supported at its ends by the upright ends 13, and said roof is transversely rounded to deter the chickens from roosting thereon and also to permit dirt to roll off the roof. It will be seen that the roof overhangs the inwardly disposed members 12 so that any dirt falling from the roof will fall outward from the opening to the reservoir and in any event, will be deflected outwardly by said members 12. Vertical guard members 18 are provided at each side of the reservoir 10 and advantageously, these are continuous from side to side and over the roof 17. The guards 18 obviously will prevent a chicken from bodily entering the trough. The members 12 are preferably made in the form of flanges integral with the sides of the reservoir 10.

Having thus described my invention I claim as new, and desire to secure by Letters Patent:

1. A drinking trough including a reservoir, inwardly disposed members at the sides of the reservoir overhanging the latter and presenting an opening affording access to the reservoir, one end of the said trough having an opening adjacent to the top of the reservoir, the said opening terminating inward from the sides of the reservoir, the ends of the reservoir and the inwardly disposed members on the reservoir serving to retain a quantity of water in the reservoir to the level of the said end opening when the trough is laid on its side; together with a roof supported above the said reservoir.

2. A drinking trough including a reservoir having inwardly disposed members at the sides thereof to overhang the reservoir and spaced to form an opening therebetween affording access to the reservoir, end members rising above the said reservoir, one of said end members having an opening adjacent to the top of the reservoir, a roof supported on said end members and overhanging the said inwardly disposed members of the reservoir, and vertical guard members extending at both sides of the trough from the reservoir to the roof.

ROLAND G. TODD.

Copies of this patent may be obtained for five cents each, by addressing the "Commissioner of Patents, Washington, D. C."